United States Patent
Rowe et al.

(10) Patent No.: US 9,718,043 B2
(45) Date of Patent: Aug. 1, 2017

(54) CORE-SHELL NANOPARTICLES AND PROCESS FOR PRODUCING THE SAME

(75) Inventors: Michael Paul Rowe, Pinckney, MI (US); Minjuan Zhang, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 659 days.

(21) Appl. No.: 12/391,543

(22) Filed: Feb. 24, 2009

(65) Prior Publication Data

US 2010/0215852 A1    Aug. 26, 2010

(51) Int. Cl.
*B01J 13/04*    (2006.01)
*B01J 13/02*    (2006.01)

(52) U.S. Cl.
CPC .............. *B01J 13/04* (2013.01); *B01J 13/02* (2013.01)

(58) Field of Classification Search
CPC .............. A61K 51/1244; A61K 9/1075; A61L 2400/12; B82Y 30/00; B82Y 40/00; B82Y 20/00; B01J 13/02; B01F 11/0077; B01F 11/0266; B01F 2003/0064; B01F 3/0811; B01F 3/0819; B01F 3/0865
USPC ........ 428/402–402.24, 403, 404, 407, 321.1, 428/474.4; 427/331, 389.9, 212, 427/213–213.36, 483, 256; 264/4–4.7, 264/534, 5, 41; 424/400, 408, 450, 451, 424/455, 93.7, 184.1, 497, 489, 501, 490, 424/491, 492, 493, 494, 495
See application file for complete search history.

(56) References Cited

U.S. PATENT DOCUMENTS

| | | | |
|---|---|---|---|
| 7,259,230 B2 * | 8/2007 | Klaehn et al. | 528/423 |
| 7,259,320 B2 | 8/2007 | Take et al. | |
| 7,592,042 B1 | 9/2009 | Koike | |
| 2006/0029802 A1 * | 2/2006 | Ying et al. | 428/403 |
| 2006/0216513 A1 * | 9/2006 | Musick et al. | 428/404 |
| 2008/0087314 A1 | 4/2008 | Xiao et al. | |
| 2009/0062407 A1 * | 3/2009 | Iversen et al. | 516/10 |

FOREIGN PATENT DOCUMENTS

| | | |
|---|---|---|
| EP | 1959508 | 8/2008 |
| JP | 2007021670 A | 2/2007 |
| JP | 2007191789 A | 8/2007 |
| JP | 2008289971 A | 12/2008 |
| WO | 2006137923 | 12/2006 |
| WO | 2008146823 | 12/2008 |

OTHER PUBLICATIONS

Limin Qi, "Synthesis of inorganic nanostructures in reverse micelles", Encyclopedia of surface colloid science, vol. 2, 2006, pp. 6183-6207.*
Foos, Edward E. et al.; "Synthesis and Characterization of Nanocrystalline Bismuth Telluride"; Nano Letters; 2001; vol. 1, No. 12; pp. 693-695.
Purkayastha, Arup et al.; "Molecularly Protected Bismuth Telluride Nanoparticles: Microemulsion Synthesis and Thermoelectric Transport Properties"; Advanced Materials; 2006; 18, pp. 2958-5963.
Fang, Jiye et al.; "Microemulsion-processed bismuth nanoparticles"; Materials Science & Engineering; B83; 2001; pp. 254-257.
Song-yuan Chang, Lei Liu, Sanford A. Asher, "Preparation and Properties of Tailored Morph9ology, Monodisperse Colloidal Silica-Dadium Sulfide Nanocomposites" J. Am. Chem. Soc. 1994, 116, 6739-6744.
Kim S. Finnie, John R. Bartlett, Christophe J. Barbe, Linggen Kong "Formation of Silica Nanoparticles in Microemulsions" Langmuir 2007, 23, 3017-3024.
Arup Purkayastha et al., "Molecularly Protected Bismuth Telluride Nanoparticles: Microemulsion Synthesis and Thermoelecric Transport Properties", Advanced Materials, 2006, 18, 2958-2963.

* cited by examiner

*Primary Examiner* — Irina S Zemel
(74) *Attorney, Agent, or Firm* — Dinsmore & Shohl LLP

(57) ABSTRACT

A process for forming thermoelectric nanoparticles includes the steps of a) forming a core material micro-emulsion, b) adding at least one shell material to the core material micro-emulsion forming composite thermoelectric nanoparticles having a core and shell structure.

25 Claims, 3 Drawing Sheets

TEM image of $Bi_2Te_3$ + $SiO_2$ composite-nanoparticles

TEM image of $Bi_2Te_3$ + $SiO_2$ composite-nanoparticles

CORE-SHELL NANOPARTICLES AND PROCESS FOR PRODUCING THE SAME

FIELD OF THE INVENTION

The invention relates to thermoelectric nanoparticles and in particular to a process for producing thermoelectric composite nanoparticles and thermoelectric composite materials.

BACKGROUND OF THE INVENTION

Thermoelectric materials and devices may be utilized to obtain electrical energy from a thermal gradient, Current thermoelectric materials have a limited thermoelectric conversion efficiency which may be defined in terms of the formula $ZT=S^2\gamma/\kappa \times T$. The ZT of the above formula or figure of merit is related on the macroscopic transport parameters of the material including the Seebeck coefficient S, the electrical conductivity $\gamma$ and the thermal conductivity $\kappa$.

In order to improve the thermoelectric conversion efficiency one may increase the Seebeck coefficient and electrical conductivity while lowering the thermal conductivity. Increasing the ZT is difficult as the three parameters S, $\gamma$ and $\kappa$ are interrelated. For example, doping of a specific material may increase the electrical conductivity while decreasing the Seebeck coefficient and increasing the thermal conductivity. There is therefore a need in the art for a material having a ZT improved over current prior art materials. There is also a need in the art for increasing the thermoelectric conversion by increasing or maintaining the Seebeck coefficient and electrical conductivity while lowering a thermal conductivity.

Nanostructured materials may be utilized to produce thermoelectric nanoparticles and materials that may be utilized to form a thermoelectric composite material, However, such nanostructured materials may be difficult and expensive to manufacture and may be difficult to process to form a composite material. There is therefore a need in the art for a thermoelectric nanostructured material and a process for producing the same that produces materials having an increased thermoelectric conversion efficiency. Additionally, there is a need in the art for a process for producing the thermoelectric nanoparticles that is cost efficient and scalable. Further, there is a need in the art for a process for producing thermoelectric composites having improved properties that overcomes technical problems of manufacturing in the prior art.

SUMMARY OF THE INVENTION

In one aspect, there is disclosed a process for forming thermoelectric nanoparticles that includes the steps of a) forming a core material micro-emulsion such as a reverse micelle or micelle, and b) adding at least one shell material to form composite thermoelectric nanoparticles having a core and shell structure.

In a further aspect, there is disclosed a process for forming thermoelectric materials that includes the steps of a) forming a core material micro-emulsion such as a reverse micelle or micelle; b) adding at least one shell material to the core material reverse micelle or micelle forming composite thermoelectric nanoparticles having a core and shell structure; and c) forming a nanocomposite material following the formation of the composite thermoelectric nanoparticles wherein the nanocomposite material includes a network of the shell material including inclusions of the core material nanoparticles.

DETAILED DESCRIPTION OF THE PREFERRED EMBODIMENTS

In a first aspect, there is described a process for forming thermoelectric nanoparticles that includes the steps of a) forming a core material micro-emulsion such as a reverse micelle or micelle, and b) adding at least one shell material to form composite thermoelectric nanoparticles having a core and shell structure. In one aspect, the at least one shell material may be included as a micro-emulsion such as a reverse micelle or micelle. The reverse micelles or micelles of the core material may be combined with the reverse micelles or micelles of the shell material. The at least one shell material may include multiple shell materials mixed in a composition or may be included individually. Additionally, the various shell materials and may be included as a solution or as reverse micelles or micelles of the various shell materials.

In one aspect, various materials may be utilized for both the core and shell materials. In one aspect, core materials may include materials such as metal, semiconductor, insulator, ceramic, carbon, polymer or combinations thereof. In a further example the core material may be a ceramic material including silica, alumina, titanium dioxide, zirconium oxide and similar materials.

In one aspect, the shell material may preferably include a material that has an appreciable thermoelectric effect when formed in a composite material. Examples of shell materials include chalcogenide semiconductors for example bismuth telluride or lead telluride based materials. Additional materials for the shell may include metals or semi-metals including binary, ternary and quaternary alloys of conductors, semiconductors, and insulators, compounds of silicon and germanium, skutterudite materials such as $CoSb_3$ materials, rare earth intermetallics such as $YbAl_3$, clathrate structured materials such as silicon germanium or SN framework based materials, $Mg_2Si$ and doped forms of $Mg_2Si$, half heusler alloys including MNiSn materials where M may represent Zr, Hf and Ti, multicomponent metal oxides such as $NaCo_2O_4$, $Ca_3Co_4O_9$, and other known thermoelectric materials and doping materials including groups III, IV, V, VI, and VII elements, oxides of such elements, alloys, and salts.

Figure 1:
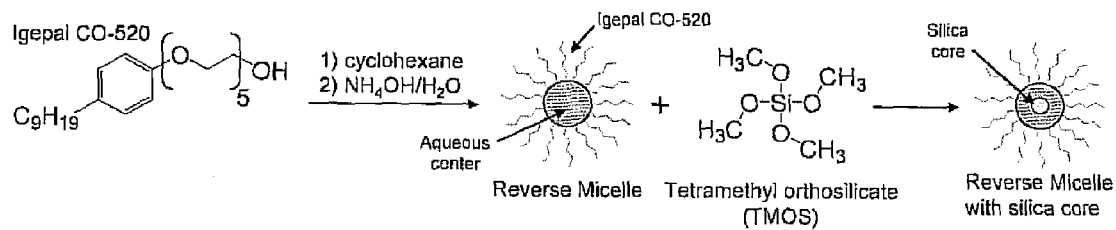
FIG. 1 is a graphical depiction of the step of forming a core material reverse micelle.

As stated above, the process may include forming a core material reverse micelle, as depicted in FIG. 1. As can be seen in FIG. 1, the step of forming a core material reverse micelle may include the steps of dissolving a surfactant in a solvent, adding a base to the dissolved solvent adjusting the PH, and then adding a core material forming a core material nanoparticle dispersed in an aqueous portion of the reverse micelle.

Figure 2:
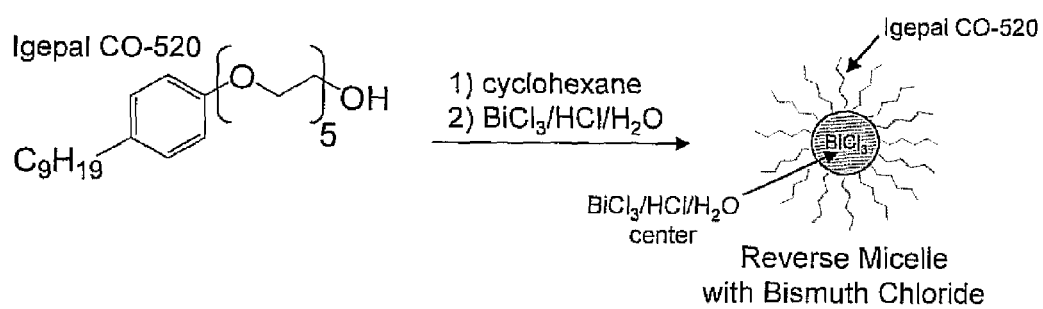
FIG. 2 is a graphical depiction of the step of forming a first shell material reverse micelle.
Figure 3:
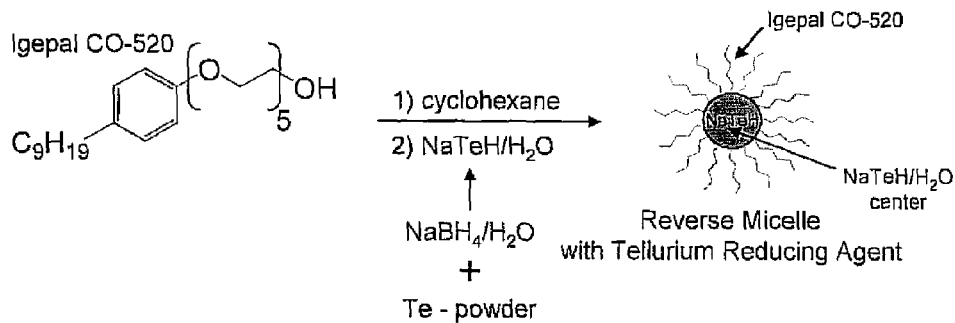
FIG. 3 is a graphical depiction of the step of forming a second shell reverse micelle.
Figure 4:
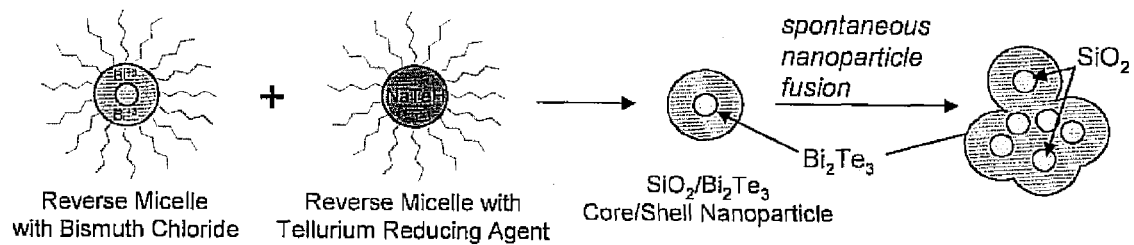
FIG. 4 is a graphical depiction of the step of combining reverse micelles forming a composite thermoelectric nanoparticle having a core and shell structure.

Referring to FIG. 2, the step of forming a shell material reverse micelle is depicted. As can be seen in FIG. 2, the step of forming a shell reverse micelle may include the step of dissolving a surfactant in a solvent, and adding a shell material to the dissolved surfactant forming a reverse micelle having an aqueous portion including the shell material.

Following the formation of the core material reverse micelle and shell material reverse micelle, the step of combining the reverse micelles of the core material and shell materials may be performed. The combination of the reverse micelles yields a reverse micelle mixture having nanoparticles of the core material dispersed in an aqueous portion of a reverse micelle that also includes the shell material.

Following the combining step described above, another shell material may be added to the reverse micelles of the previous step to form a composite thermoelectric nanoparticle having a core and shell structure. The additional shell material may be added directly to the reverse micelles or alternatively the second shell material may be combined through the use of another shell reverse micelle. In one aspect, the step of forming another shell reverse micelle may include the steps of dissolving a surfactant in a solvent and then adding another shell material to the dissolved surfactant forming another reverse micelle having an aqueous portion including the additional shell material. It should be realized that various numbers of shell materials may be utilized including a plurality of shell materials in a composition or individually.

In one aspect, the shell materials may be selected such that the ions of the shell material are reduced in the presence of another shell material such that a spontaneous alloying occurs about the core material nanoparticle forming the core and shell structure. In one aspect, the core material nanoparticles may have a size of from 0.5 to 50 nanometers in diameter. Additionally, the composite thermoelectric nanoparticles having the core and shell structure may have a size of from 1.5 nanometers to 10 microns in diameter. The use of reverse micelles allows for control over the sizes and thickness of the core and shell materials in a precise manner. In one aspect, the shell material may spontaneously fuse to form composite thermoelectric nanoparticles having the core material nanoparticles dispersed in a matrix of the shell material due to the lack or absence of a passivating or capping ligand.

Following the formation of the core and shell nanoparticle composite various isolation and decontamination steps may be performed. For example, the process may include the step of decanting the composite thermoelectric nanoparticles following their formation. Additionally, the step of washing the composite thermoelectric nanoparticles may also be performed to minimize the amount of contaminants that may be included in the thermoelectric nanoparticles. In one aspect, the washing step may include the steps of washing the composite thermoelectric nanoparticles with an organic solvent and washing with water multiple times with each washing step following by isolating the nanoparticles. Additional washing procedures using acids or base or water may also be performed to limit the amount of contaminants in the nanoparticles.

Following the formation of the thermoelectric nanoparticles, the material may be formed into a nanocomposite material for use in thermoelectric devices. In one aspect, the forming step may include sintering the composite thermoelectric nanoparticles forming a network of the shell material including inclusions of the core material nanoparticles. The sintering may or may not alloy the nanoparticles. The sintering may or may not increase the crystallinity of the thermoelectric material and/or inclusions. The size of crystalline domains and regions may or may not be affected by sintering. In this manner, the figure of merit of a thermoelectric material may be improved over current prior art thermoelectric materials.

EXAMPLES

The following examples are detailed for the process wherein bismuth telluride shell materials are formed about a silicon dioxide core to form the composite nanoparticles. It should be realized that various other materials may be utilized for both core and shell materials.

Example 1

Igepal CO-520 (23.332 g) is first dissolved in cyclohexane (265 mL). An aqueous solution of ammonium hydroxide (pH 10 to 11) is added (5.74 mL), and is stirred for at least 5 minutes. The solution becomes completely clear as the reverse micelles form. Tetramethyl orthosilicate (TMOS) is then added (3.35 mL). The reaction is stirred for 4 hours, during which time the TMOS diffuses from the cyclohexane phase into the aqueous cores of the reverse micelles. In the basic aqueous cores of the reverse micelles, the TMOS reacts to form silica nanoparticles ranging in size from 0.5 to 50 nm in diameter.

In a separate flask, Igepal CO-520 (32.793 g) is dissolved in cyclohexane (240 mL). A solution (33 mL) of bismuth chloride (7.794 g) in 2.5M aqueous HCl is added to this other Igepal CO-520 and cyclohexane solution. It is then stirred for 10 mins to form reverse micelles that possess aqueous cores of the aqueous bismuth chloride solution.

The two types of reverse micelles, ones containing $SiO_2$-nanoparticles and the others containing the $BiCl_3$ solution are combined and mixed to produce reverse micelles with aqueous cores containing both the $SiO_2$-nanoparticles and bismuth chloride.

A NaTeH reducing agent is synthesized as needed per synthesis. Tellurium powder (4.772 g) is added to $H_2O$ (21 mL), and the whole reaction Bask is cooled in an ice bath and degassed with argon. Sodium borohydride (2.934 g) is added to the reaction in portions over ~2 minutes, and it is then stirred under argon for 12 hrs. The addition of sodium borohydride is exothermic and evolves hydrogen gas. The reaction is cooled at this step to avoid the possible ignition of the hydrogen gas being produced. The oxygen-free environment may be maintained for the NaTeH throughout the synthesis because oxygen will convert it back to tellurium metal.

A third type of reverse micelle was formed by again dissolving Igepal CO-520 (13.362 g) in cyclohexane (100 mL). The NaTeH reaction solution is added to form reverse micelles, after stirring for 10 mins, with an aqueous core containing the tellurium reducing agent.

The NaTeH reverse micelle is then mixed with the combined $SiO_2$-nanoparticle+$BiCl_3$ reverse micelle. When the NaTeH reverse micelles merge with the $SiO_2$-nanoparticle+$BiCl_3$ reverse micelles, the bismuth-ion is reduced to bismuth-metal in the presence of tellurium-metal, resulting in a spontaneous alloying around the silica-cores.

After 1 hour, the reaction solution is then decanted to collect the black precipitate. This material is washed with 200 mL acetone, 200 mL $H_2O$, 200 mL $H_2O$, and then 200 mL acetone, with centrifugation after each washing step to recover dispersed material before the black slurry is washed with the next solvent.

Figure 5:
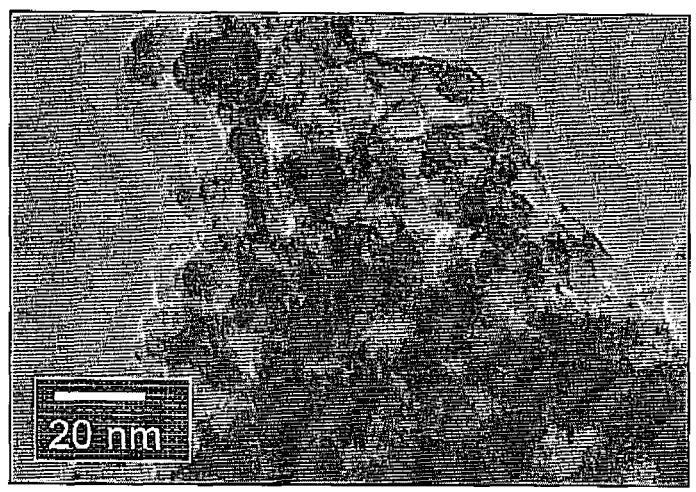
FIG. 5 is a TEM image of an aggregated bismuth telluride network having silicon dioxide nanoparticles dispersed therein.
Figure 6:
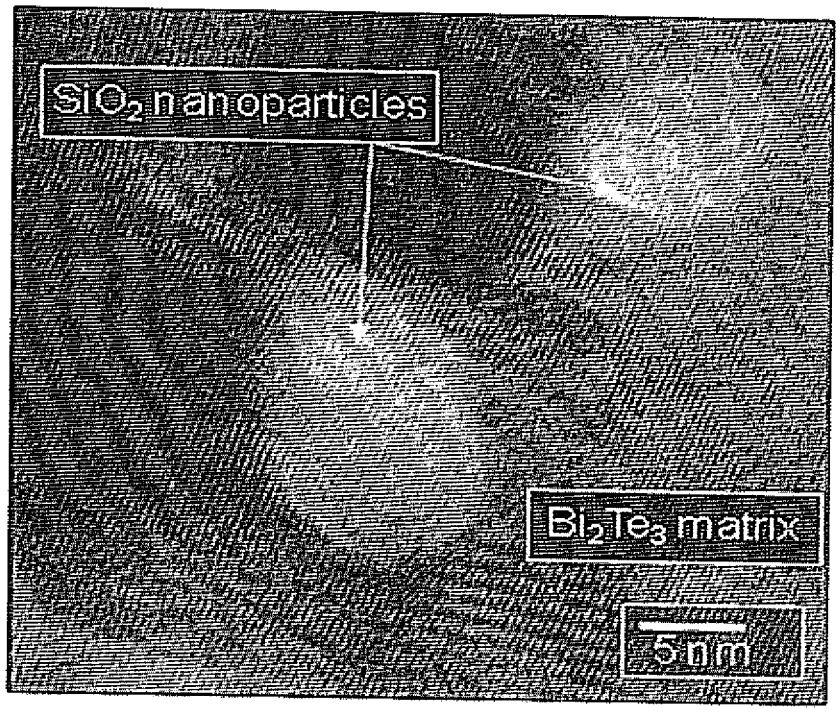
FIG. 6 is a TEM image of a bismuth telluride network having silicon dioxide nanoparticles dispersed therein.

Referring to FIGS. 5 and 6, there are shown TEM images of the composite nanoparticles formed by the above-outlined synthesis. As can be seen in the figure, the clusters are composed of individual composite nanoparticles that have spontaneously aggregated because of the absence of surfactant or a capping agent. Additionally as can be seen, the core nanoparticles of silicon dioxide having 0.5 to 50 nanometer features are dispersed within a matrix of the bismuth telluride material.

Example 2

Figure 7:
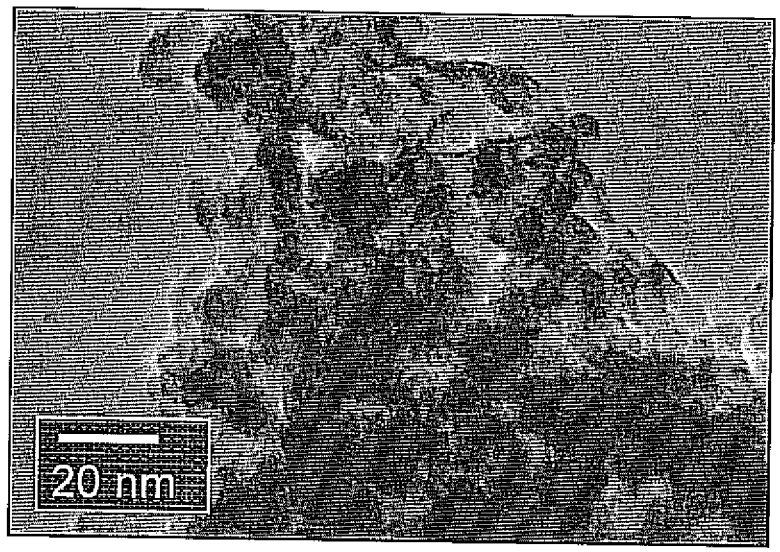
FIG. 7 is a TEM image depicting silicon dioxide nanoparticles dispersed within the bismuth telluride matrix.

Composite-nanoparticles were hot-press sintered at 350° C. and 20 MPa for 32 minutes yielding a thermoelectric composite material. Referring to FIG. 7, there is shown a TEM image of the nanocomposite material formed by the procedure outlined above. As can be seen in the figure, crystalline domains of bismuth telluride have embedded amorphous nanoparticles of silicon dioxide. Additionally, the nanocomposite structure of these silicon dioxide nanoparticle inclusions in the bismuth telluride matrix is clearly depicted.

The foregoing drawings, discussion and description are illustrative of specific embodiments of the present invention but are not meant to be limitations upon the practice of the invention. Various modifications of the invention will be readily apparent to those of skill in the art in view of the teaching presented above. It is the following claims including all equivalents that define the scope of the invention.

The invention claimed is:

1. A process for forming thermoelectric nanoparticles including the steps of:
   a) forming a core material micro-emulsion;
   b) adding at least one shell material formed of $BiCl_3$ to the core material micro-emulsion;
   adding another shell material formed of NaTeH wherein bismuth ions of the $BiCl_3$ are reduced to bismuth metal in the presence of tellurium wherein a spontaneous forming occurs about the core material forming composite thermoelectric nanoparticles having a core material and shell of $Bi_2Te_3$.

2. The process of claim 1 wherein the micro-emulsion is selected from reverse micelles and micelles.

3. The process of claim 1 wherein the at least one shell material includes a plurality of shell materials forming a shell material composition.

4. The process of claim 1 wherein the step of adding at least one shell material includes forming at least one shell material micro-emulsion.

5. The process of claim 4 wherein the at least one shell micro-emulsion is selected from reverse micelles and micelles.

6. The process of claim 4 including the step of combining the micro-emulsion of the core material and the at least one shell material micro-emulsion.

7. The process of claim 6 including the step of adding another shell material to the combined micro-emulsions of the core material and the at least one shell material.

8. The process of claim 1 wherein the step of forming the core material micro-emulsion includes introducing a core into a reverse micelle or micelle.

9. The process of claim 4 including the step of forming additional shell material micro-emulsions.

10. The process of claim 9 including the step of combining the micro-emulsion of the core material and the additional shell micro-emulsions.

11. The process of claim 1 wherein the step of forming a core material micro-emulsion includes the steps of:
   ai) dissolving a surfactant in an organic solvent or aqueous solution;
   aii) adding an aqueous phase or organic phase to the dissolved surfactant; and a step selected from the group consisting of:
      aiii) adjusting the pH to initiate a core formation reaction;
      aiv) introducing a reagent to initiate a core formation reaction;
      av) irradiating or heating to initiate a core formation reaction;
      avi) adjusting the pH to stabilize the system;
      avii) direct addition of a core structure or structures to the reverse micelles or micelles;
      aviii) adding a core material to the material of step aiii) forming core material nanoparticles dispersed in an aqueous portion of the reverse micelle or micelle;
      aix) adding a core material to the material of step aiv) forming core material nanoparticles dispersed in an aqueous portion of the reverse micelle;
      aix) adding a core material to the material of step av) forming core material nanoparticles dispersed in an aqueous portion of the reverse micelle.

12. The process of claim 4 wherein the step of forming a shell material micro-emulsion includes the steps of:
   bi) dissolving a surfactant in a solvent or aqueous solution;
   bii) adding a shell material to the dissolved surfactant forming a reverse micelle or micelle having a solvent or an aqueous portion including the at least one shell.

13. The process of claim 12 wherein the step of forming the shell material micro-emulsion includes the steps of:
   ci) dissolving a surfactant in a solvent or aqueous solution;
   cii) adding an additional shell material to the dissolved surfactant forming another micro-emulsion having an aqueous portion including the additional shell material.

14. The process of claim 1 wherein the thermoelectric composite nanoparticles include a core selected from $SiO_2$, metals, semiconductors, insulators, ceramics, carbon, polymers or combinations thereof and ceramic materials including alumina, titanium dioxide, and zirconium oxide.

15. The process of claim 14 wherein the step of forming a core material micro-emulsion includes the steps of:
   q) dissolving a surfactant in a solvent;
   r) adding ammonium hydroxide to the dissolved surfactant;
   s) adding tetramethylorthosilicate to the material of step r) forming $SiO_2$ nanoparticles dispersed in an aqueous portion of the micro-emulsion.

16. The process of claim 15 wherein the step of forming a shell micro-emulsion includes the steps of:
   t) dissolving a surfactant in a solvent;
   u) adding $BiCl_3$ to the dissolved surfactant forming a second micro-emulsion having an aqueous portion including $BiCl_3$.

17. The process of claim 16 wherein the step of forming a shell micro-emulsion includes the steps of:
  v) dissolving a surfactant in a solvent;
  w) forming a NaTeH material and adding the NaTeH material to the dissolved surfactant forming a second shell micro-emulsion having an aqueous portion including NaTeH.

18. The process of claim 1 wherein the core material nanoparticles have a size of from 1.5 to 50 nanometers in diameter.

19. The process of claim 1 wherein the composite thermoelectric nanoparticles have a size of from 1.5 nanometers to 10 microns in diameter.

20. The process of claim 1 wherein the composite thermoelectric nanoparticles have a shell thickness of 1 to 100 nanometers.

21. The process of claim 1 including the step of decanting the composite thermoelectric nanoparticles.

22. The process of claim 1 including the step of washing the composite thermoelectric nanoparticles.

23. The process of claim 22 wherein the washing step includes the steps of washing the composite thermoelectric nanoparticles with an organic solvent and washing with water multiple times with each washing followed by isolation of nanoparticles.

24. The process of claim 1 including the step of forming a nanocomposite material following the formation of the composite thermoelectric nanoparticles wherein the nanocomposite material includes a network.

25. The process of claim 24 when the forming step includes sintering the composite thermoelectric nanoparticles forming a network of the shell material including inclusions of the core material nanoparticles.

* * * * *